US011431289B2

(12) United States Patent
Hassabou

(10) Patent No.: US 11,431,289 B2
(45) Date of Patent: Aug. 30, 2022

(54) COMBINATION PHOTOVOLTAIC AND THERMAL ENERGY SYSTEM

(71) Applicant: Abdelhakim Mohamed Abdelghany Hassabou, Doha (QA)

(72) Inventor: Abdelhakim Mohamed Abdelghany Hassabou, Doha (QA)

(*) Notice: Subject to any disclaimer, the term of this patent is extended or adjusted under 35 U.S.C. 154(b) by 210 days.

(21) Appl. No.: 15/015,449

(22) Filed: Feb. 4, 2016

(65) Prior Publication Data
US 2017/0230000 A1    Aug. 10, 2017

(51) Int. Cl.
*H02S 40/44* (2014.01)
*H02S 40/22* (2014.01)
*H02S 20/10* (2014.01)
*H02S 40/42* (2014.01)
*F28D 20/00* (2006.01)
*F24S 23/70* (2018.01)
*F24S 20/00* (2018.01)

(52) U.S. Cl.
CPC .............. *H02S 40/44* (2014.12); *F24S 23/70* (2018.05); *F28D 20/00* (2013.01); *H02S 20/10* (2014.12); *H02S 40/22* (2014.12); *H02S 40/425* (2014.12); *F24S 2020/17* (2018.05); *Y02E 10/40* (2013.01); *Y02E 10/52* (2013.01); *Y02E 10/60* (2013.01); *Y02E 60/14* (2013.01); *Y02E 70/30* (2013.01)

(58) Field of Classification Search
CPC ..... H01L 31/00; H01L 31/02; H01L 31/0232; H01L 31/02325; H01L 31/024; H01L 31/04; H01L 31/052; H01L 31/0521; H01L 31/0525; H01L 31/053; H01L 31/054; H01L 31/0547; H01L 31/056; H02S 10/00; H02S 10/30; H02S 40/00; H02S 40/20; H02S 40/22; H02S 40/40; H02S 40/42; H02S 40/44; F24J 2/00; F24J 2/0015; F24J 2/0007; F24J 2/04; F24J 2/0477; F24J 2/0488; F24J 2/0494; F24J 2/06; F24J 2/10; F24J 2/20; F24J 2/24
See application file for complete search history.

(56) References Cited

U.S. PATENT DOCUMENTS

| | | | |
|---|---|---|---|
| 4,373,573 A | 2/1983 | Madwed | |
| 4,577,679 A * | 3/1986 | Hibshman | F24J 3/085 165/236 |
| 6,701,914 B2 | 3/2004 | Schwarz | |
| 7,821,151 B2 | 10/2010 | Le et al. | |
| 8,664,514 B2 | 3/2014 | Watters | |
| 9,099,591 B1 * | 8/2015 | Gurin | H01L 31/052 |
| 2009/0199892 A1 | 8/2009 | Farquhar | |
| 2010/0031991 A1 * | 2/2010 | Mochizuki | H01L 35/30 136/259 |

(Continued)

*Primary Examiner* — Christina Chern
(74) *Attorney, Agent, or Firm* — Nath, Goldberg & Meyer; Richard C. Litman

(57) ABSTRACT

The combination photovoltaic and thermal energy system includes a reverse flat plate solar collector (RFPC) mounted above a ground-based thermal energy storage reservoir and a hybrid photovoltaic-thermal (PV-T) panel mounted above the absorber plate of the RFPC. Heat exchanger pipes or conduits in the RFPC and the PV-T are connected so that the heat exchange fluid is preheated in the PV-T and then passes through the RFPC absorber plate, where it is heated to intermediate temperature ranges. The PV-T panel may be a monofacial PC-T panel, a bifacial PV-T panel, or a trifacial PV-T panel.

5 Claims, 5 Drawing Sheets

(56) References Cited

U.S. PATENT DOCUMENTS

| | | |
|---|---|---|
| 2012/0132393 A1 | 5/2012 | Pilebro et al. |
| 2013/0068418 A1 | 3/2013 | Gotland et al. |
| 2013/0206134 A1 | 8/2013 | O'Donnell et al. |
| 2013/0276865 A1* | 10/2013 | Aspnes ............... H01L 31/0525 136/246 |
| 2013/0336721 A1* | 12/2013 | McBride ................ E21D 11/00 405/55 |
| 2014/0283517 A1 | 9/2014 | Schubert |
| 2014/0311551 A1 | 10/2014 | Pang |
| 2017/0063295 A1* | 3/2017 | Panish ................... H02S 10/40 |

\* cited by examiner

COMBINATION PHOTOVOLTAIC AND THERMAL ENERGY SYSTEM

BACKGROUND OF THE INVENTION

1. Field of the Invention

The present invention relates to power generation and storage, and particularly to a combination photovoltaic and thermal energy system that combines a reverse flat plate collector (RFPC) with a hybrid photovoltaic-thermal (PV-T) collector panel for generation of electrical energy and efficient use of waste energy.

2. Description of the Related Art

Due to environmental concerns related to the burning of fossil fuels, there is great interest in clean and renewable energy sources, particularly in the form of solar energy. Photovoltaics are of primary interest due to their ability to directly convert solar radiation into usable electricity. Although solar panels are not yet efficient enough to make photovoltaic power generation profitable, efficiencies have been increasing over the past few decades, indicating an ever-increasing trend. In addition to photovoltaics, there is great interest in utilizing the thermal energy also associated with solar radiation. In order to integrate such systems with homes, office buildings and the like, there is great interest in using fluid-based systems involving heat exchange, where the source of heat being concentrated is solar radiation.

FIG. 2 illustrates a conventional reverse flat plate collector (RFPC), which is a promising form of solar collector for fluid-based energy recovery, storage and generation systems. As shown, a conventional RFPC 100 includes a stationary concentrating reflector 102 which is mounted beneath an inverted absorber plate 104. In order to provide protection from the elements, a glass plate 106, or the like, is typically provided to cover seal the collector cavity 108 defined by the concentrating reflector 102. As shown, solar radiation SR is reflected and concentrated onto the inverted absorber plate 104, which typically includes a plurality of conduits through which the heat-exchange fluid flows. The inverted absorber plate 104 is arranged horizontally, as shown, so that the collector cavity 108 becomes thermally stratified and convection currents are suppressed. The RFPC 100 significantly reduces convective heat losses when compared against a typical flat plate collector system or the like, thus making it of interest for new clean thermal systems.

Photovoltaic collectors become less efficient at higher temperatures. It is preferable to operate photovoltaic collectors below about 40° C. Nevertheless, thermal energy is also required for many applications (e.g., air conditioning systems, desalination, etc.) from 80° C. up to 300° C. Reverse flat plate collectors have shown promise for supplying thermal energy at intermediate temperatures between 100° C. and 200° C. It would be desirable to provide a system that efficiently converts solar energy into both electrical and thermal energy.

Thus, a combination photovoltaic and thermal energy system solving the aforementioned problems is desired.

SUMMARY OF THE INVENTION

The combination photovoltaic and thermal energy system includes a reverse flat plate solar collector (RFPC) mounted above a ground-based thermal energy storage reservoir and a hybrid photovoltaic-thermal (PV-T) panel mounted above the absorber plate of the RFPC. Heat exchanger pipes or conduits in the RFPC and the PV-T are connected so that the heat exchange fluid is preheated in the PV-T and then passes through the RFPC absorber plate, where it is heated to intermediate temperature ranges. The PV-T panel may be a monofacial PC-T panel, a bifacial PV-T panel, or a trifacial PV-T panel.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1A:
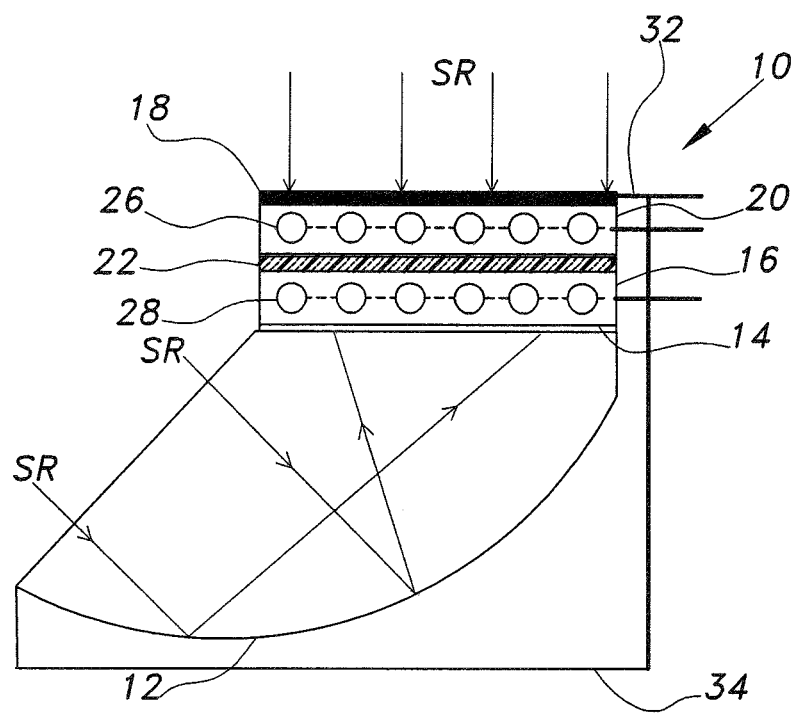
FIG. 1A is a diagrammatic partial end view of a first embodiment of a combination photovoltaic and thermal energy system according to the present invention.
Figure 1B:
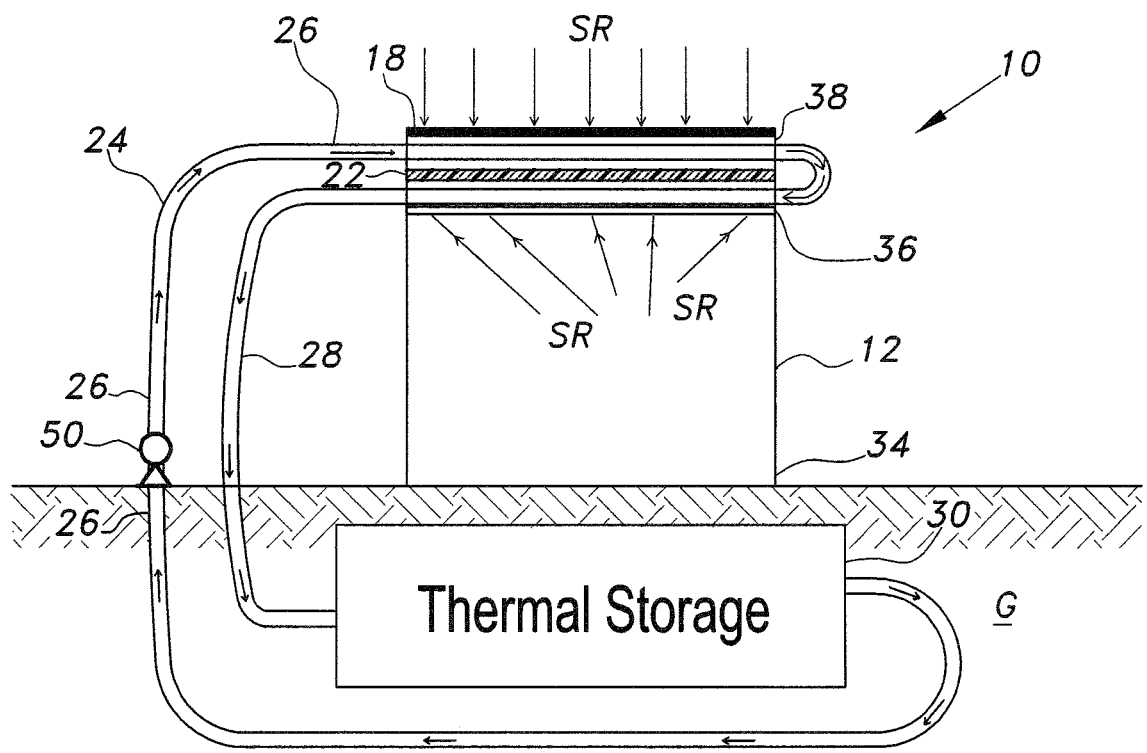
FIG. 1B is a diagrammatic partial side view of the combination photovoltaic and thermal energy system of FIG. 1A, shown with parts omitted for clarity.
Figure 2:
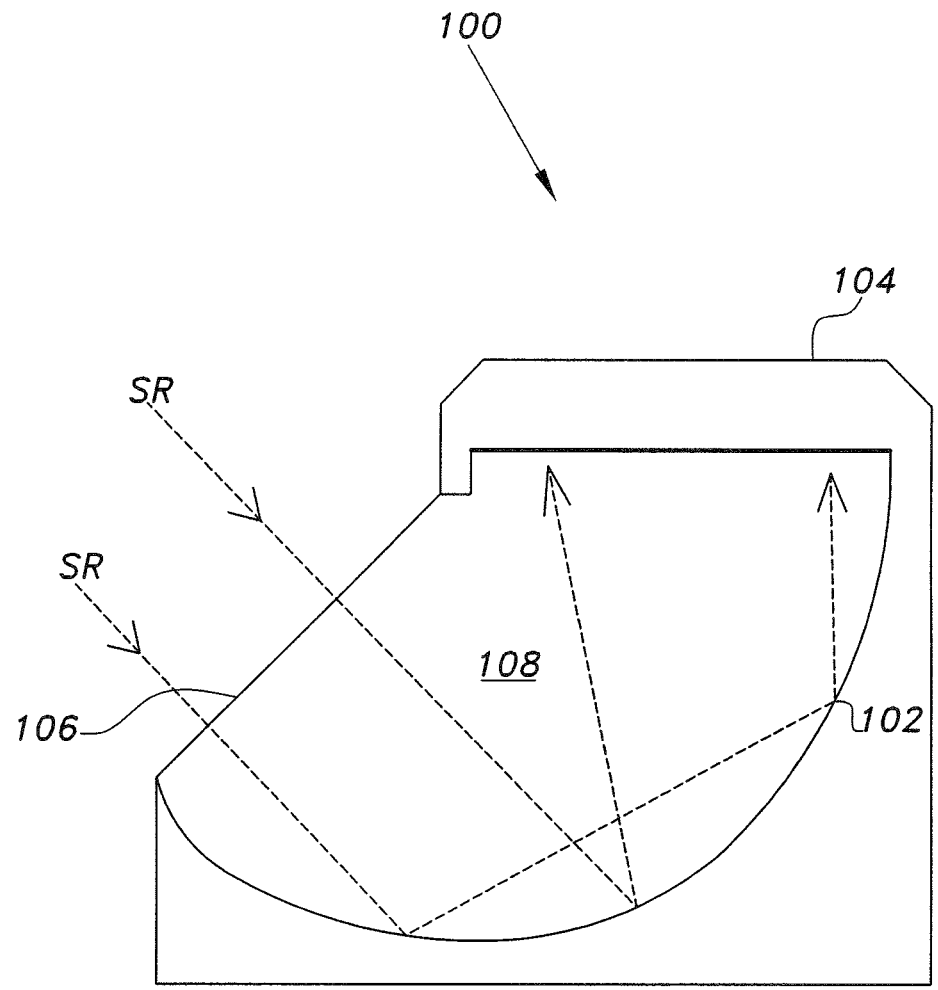
FIG. 2 is a diagrammatic side view of a conventional reverse flat plate collector (RFPC) according to the prior art.

Referring now to FIGS. 1A and 1B, the first embodiment of a combination photovoltaic and thermal energy system 10 combines a reverse flat plate collector (RFPC) for solar thermal heating with a hybrid photovoltaic-thermal panel for the generation of electrical energy. The system 10 includes a solar reflector 12, having upper and lower portions, 32, 34, respectively, and an absorber plate 16 mounted on the upper portion 32 of the solar reflector 12. The lower portion 34 is adapted for mounting on a support surface, such as the ground G. As shown, solar radiation SR is reflected by the solar reflector 12 and is concentrated on a lower surface 36 of the absorber housing 16 (the flat plate) for heating thereof. The solar reflector 12 and absorber plate 16 are preferably configured in a manner similar to a conventional RFPC system, such as RFPC 100, described above. A hybrid photovoltaic-thermal (PV-T) panel 18 is mounted above the flat plate of the reverse flat plate collector. The PV-T panel 18 has a heat exchanger 20, or at least heat exchange tubes or pipes, mounted on the panel behind or on the back surface 38 of the panel of photovoltaic solar cells. The heat exchange tubes or pipes 20 absorb heat incident on the photovoltaic panel in order to cool the photovoltaic cells, resulting in more efficient generation of electricity. The heat exchange medium may be air, but is preferably a liquid heat exchange media.

It should be understood that photovoltaic panel 18 may be any conventional type of hybrid photovoltaic-thermal panel for conversion of solar radiation into usable electricity, and may be connected to any desired external load or rechargeable power supply or the like, as is well known in the art. Further, it should be understood that the overall configuration and relative dimensions of solar reflector 12, absorber housing 16 and PV-T panel 18 are shown in FIGS. 1A and 1B for exemplary purposes only, and may be varied in any suitable desired manner. Further, as best shown in FIG. 1A, a transparent panel 14, made of glass or the like, may be mounted on the lower surface 36 of absorber housing 16 for both supporting absorber housing 16, as well as for protection thereof from the elements.

At least one conduit 24 is provided, including a cool leg 26 and a hot leg 28. In FIG. 1A, six such conduits 24 are shown, including portions connecting the heat exchange tubes 20 in the PV-T panel 18 with the heat exchange tubes 16 in the RFPC, as will be described in detail below. However, it should be understood that any desired number of conduits 24 may be utilized.

The cool leg 26 of the at least one conduit 24 passes through the heat exchange tubes 20 of the PV-T panel 18, and, as best shown in FIG. 1B, the hot leg 28 passes through the absorber housing 16 of the RFPC. The at least one conduit 24 carries a heat exchange fluid, such as water, a refrigerant, a phase-change fluid or the like, and passes through a heat sink 30, such that the heat exchange fluid is pre-heated by the heat absorbed by the heat exchange tubes 20 of the PV-T panel 18, further heated by the reflected solar radiation SR absorbed in the heat exchange tubes 16 of the RFPC, and is then stored in the heat sink 30, until required by a device or application that requires heat.

In FIG. 1B, the heat sink 30 for thermal storage is shown as being buried in the ground G, although it should be understood that this configuration is shown for exemplary purposes only. The heat sink 30 may be any suitable type of heat sink or heat exchanger for thermal storage, as is well known in the art, such as water, sand, a phase change material (PCM), a PCM in a metal matrix, etc. For additional thermal storage, a conventional storage foundation may be further provided, such as a conventional concrete foundation (typically capable of heating to temperatures of approximately 80° C.), fired bricks (typically capable of heating to temperatures of approximately 600° C.), or the like.

A layer of thermal insulation 22 is preferably sandwiched between the hybrid PV-T panel 18 and the flat absorber plate 16 of the RFPC to prevent the PV-T panel 18 from being heated by the reflected solar radiation absorbed by the RFPC. Further, in FIG. 1B, an exemplary pump 50 is shown for circulating the heat exchange fluid within conduit 24. It should be understood that any suitable type of pump may be utilized.

Figure 3:
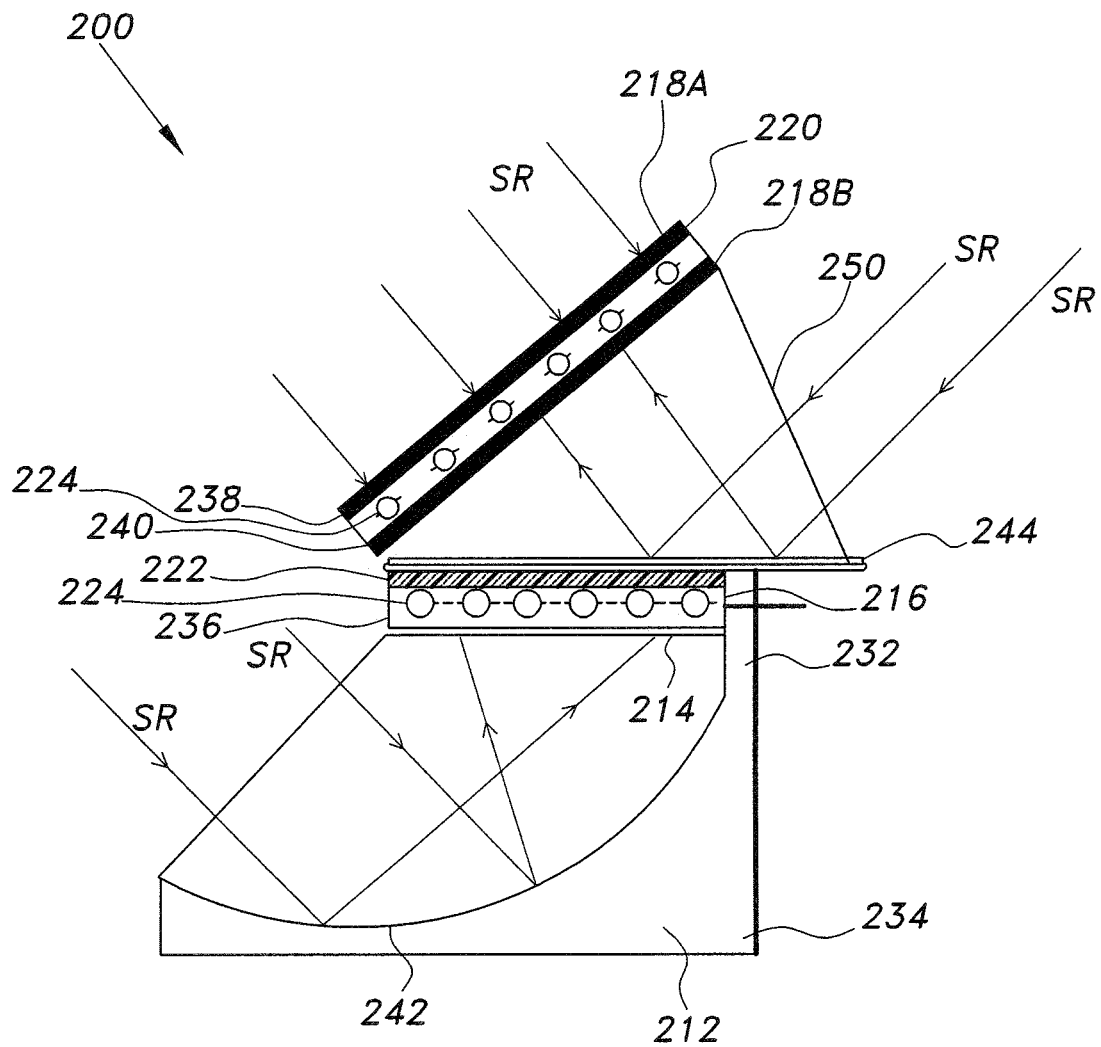
FIG. 3 is a diagrammatic partial end view of a second embodiment of a combination photovoltaic and thermal energy system according to the present invention.

In the alternative embodiment of FIG. 3, the combination photovoltaic and thermal energy system 200 includes a solar reflector 212 having upper and lower portions 232, 234, respectively, and a first reflective surface 242. As in the previous embodiment, an absorber housing 216 is mounted on the upper portion 232 of the solar reflector 212, such that solar radiation SR is reflected by the first reflective surface 242 of the solar reflector 212 and is concentrated on a lower surface 236 of the absorber housing 216 for heating thereof. A hybrid photovoltaic-thermal (PV-T) panel 220 is mounted above the absorber housing 216. However, as opposed to the system 10 of FIGS. 1A and 1B, the hybrid photovoltaic-thermal (PV-T) panel 220 is a bifacial PV-T panel mounted in an angled configuration by any suitable type of support 250, such as a transparent panel, one or more struts, or the like.

The bifacial PV-T panel 220 includes a first photovoltaic face 218A that receives solar radiation by direct exposure to the rays of the sun, and a second photovoltaic face 218B that receives solar radiation reflected by a reflective surface 244 mounted on an upper surface of the absorber housing 216 (the flat plate of the RFPC). Heat exchange operates in a similar manner to the embodiment of FIGS. 1A and 1B. Heat exchanges tubes are mounted between the rear surface 238 of the first photovoltaic face 218A and the rear face 240 of the second photovoltaic face of the hybrid bifacial PV-T. The heat exchange tubes of the hybrid bifacial PV-T panel are connected to the heat exchange tubes 224 of the reverse flat plate collector (RFPC) so that the heat exchange fluid is pre-heated in the hybrid PV-T panel, further heated by absorbance of reflected solar radiation in the RFPC, and stored in thermal storage.

As in the previous embodiment, a transparent panel 214, made from glass or the like, may be mounted on the lower surface 236 of absorber housing 216, and an insulating panel 222 may be provided between absorber housing 216 and the second reflective surface 244.

Figure 4A:
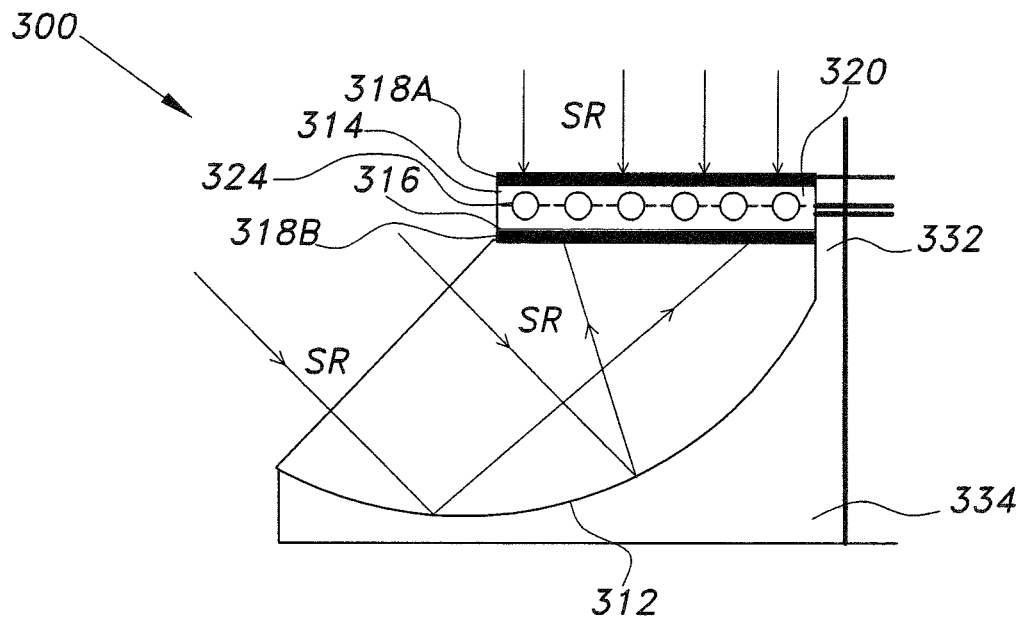
FIG. 4A is a diagrammatic partial end view of a third embodiment of a combination photovoltaic and thermal energy system according to the present invention.
Figure 4B:
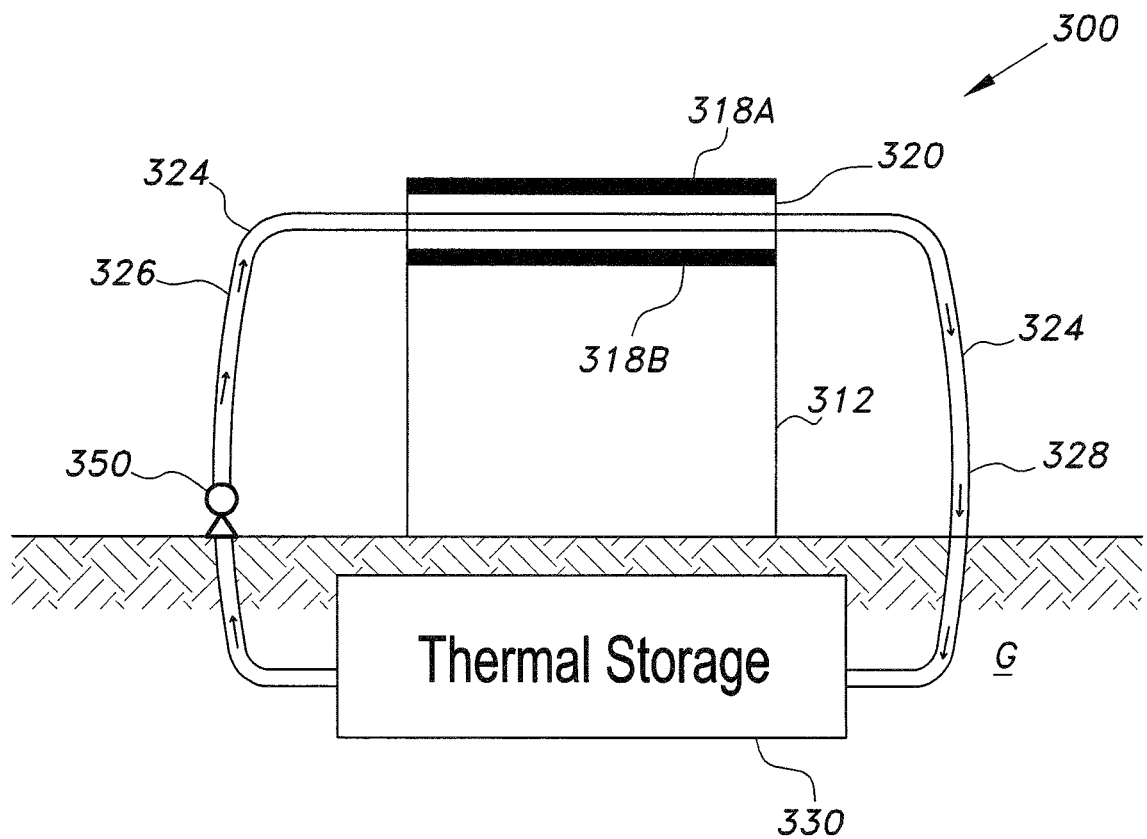
FIG. 4B is a diagrammatic partial side view of the combination photovoltaic and thermal energy system of FIG. 4A, shown with parts omitted for clarity.

In the further alternative embodiment of FIGS. 4A and 4B, the combination photovoltaic and thermal energy system 300 includes a bifacial hybrid photovoltaic-thermal (PV-T) panel, but in this case, the PV-T panel is incorporated into the reverse flat plate collector (RFPC) so that the second face 318B both includes photovoltaic solar cells and absorption solar cells for absorbing heat from the reflected solar radiation. As in the previous embodiments, a solar reflector 312 is provided having upper and lower portions 332, 334, respectively. The lower portion 334 is adapted for mounting on a support surface, such as the ground G.

The absorber plate 320 of the RFPC extends directly from the upper portion 332 of the solar reflector 312, and the first and second photovoltaic faces 318A, 318B are respectively mounted on upper and lower surfaces 314, 316 of the absorber plate 320. A first portion of solar radiation SR is reflected by the solar reflector 321 and impinges on the lower photovoltaic face 318B, and a second portion of the solar radiation SR impinges directly on the first photovoltaic face 318A. As in the previous embodiments, the upper and lower photovoltaic panels 318A, 318B, respectively, may be connected to an external electrical load, rechargeable power supply or the like, as is conventionally known.

Heat exchanger tubes 324 extend through the absorber plate 320 between the first and second faces 318A, 318B of photovoltaic solar cells. The heat exchanger tubes 324 have a cooling portion 326 and a heating portion 328. In FIG. 4A, six such conduits 324 are shown passing through cooling housing 320. However, it should be understood that any desired number of conduits 324 may be utilized. As in the previous embodiments, a heat sink 330 is provided for thermal storage. The heat exchanger tubes 324 carry a heat exchange fluid and also pass through the heat sink 330. The heat exchange fluid absorbs thermal energy within the absorber plate 320 and transfers heat away from the upper and lower photovoltaic faces 318A, 318B. The heated heat exchange fluid is transferred through the heating portion 328 of the at least one conduit 324 to the heat sink 330 and is cooled as it passes therethrough. The cooled heat exchange fluid then passes through the cooling portion 326 of the at least one conduit 324 for recycling through the absorber plate 320. As in the previous embodiments, a pump 350, or the like, is preferably provided for circulating the heat exchange fluid within at least one conduit 324. It should be understood that any suitable type of pump may be utilized.

As in the previous embodiments, it should be understood that any suitable type of heat exchange fluid may be utilized, such as water, a refrigerant, a phase-change fluid or the like. Similarly, it should be understood that any suitable type of heat exchanger, heat sink, and/or thermal storage unit may be used, as in the previous embodiments. In FIG. 4B, the heat sink 330 for thermal storage is shown as being buried in the ground G, although it should be understood that this configuration is shown for exemplary purposes only. Heat sink 330 may be any suitable type of heat sink or heat exchanger for thermal storage, as is well known in the art, such as, for example, water, sand, a phase change material (PCM), a PCM in a metal matrix or the like. For additional thermal storage, a conventional storage foundation may be further provided, such as, for example, a conventional concrete foundation, fired bricks or the like.

Figure 5:
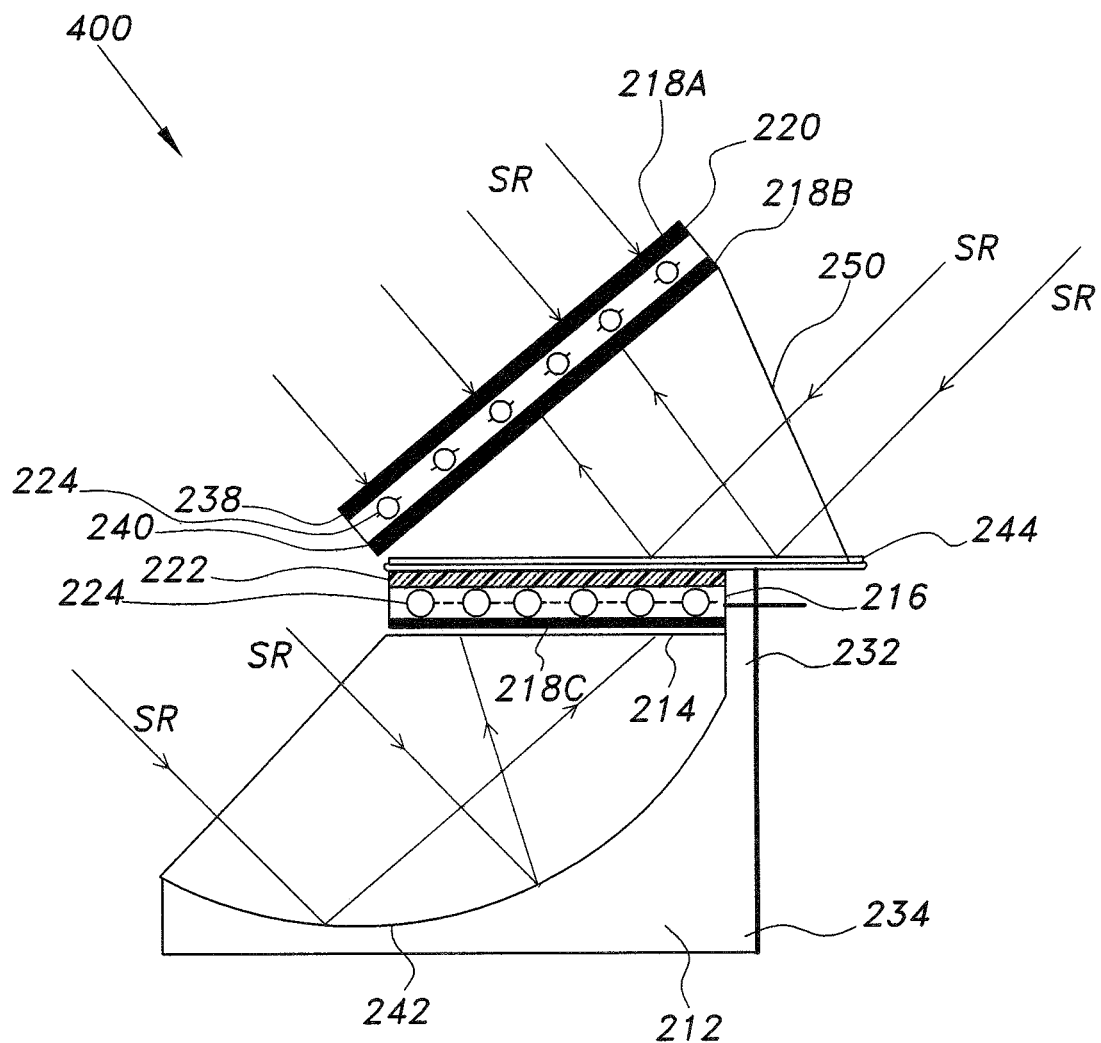
FIG. 5 is a diagrammatic partial end view of a fourth embodiment of a combination photovoltaic and thermal energy system according to the present invention.

FIG. 5 shows yet another embodiment of a combination photovoltaic and thermal energy system 400 that is similar to the system 200 of FIG. 3, but includes a third face 218C of photovoltaic solar cells, which may be disposed below the absorber plate of the RFPC behind the transparent panel 214, thereby forming what may be termed a trifacial hybrid photovoltaic-thermal (PV-T) panel combined with the reverse flat plate collector (RFPC) and the below ground thermal storage. In this embodiment, solar radiation is reflected to the bottom of the absorber plate of the RFPC so that it both produces additional electricity when it strikes the third photovoltaic face 218C and also provides thermal radiation that heats the heat exchanger tubes 224 in the absorber plate when it passes through the transparent panel 214. As in the system 200 of FIG. 3, the heat exchange fluid is pre-heated by a first pass through the heat exchange tubes 224 disposed between the first and second faces 218A, 218B of the hybrid PV-T panel, and then is further heated by absorption of reflected solar radiation in the absorber plate of the RFPC, before being conveyed to belowground thermal storage until needed by a device or application (e.g., air conditioning) requiring thermal energy.

It is to be understood that the present invention is not limited to the embodiments described above, but encompasses any and all embodiments within the scope of the following claims.

I claim:

1. A combination photovoltaic and thermal energy system, comprising:
a solar reflector, the solar reflector including an upper portion and a lower portion and a first reflective surface extending from the upper portion to the lower portion;
a reverse flat plate collector (RFPC) for collecting thermal energy from solar radiation, the RFPC consisting of an absorber plate extending horizontally above the first reflective surface, a second reflective surface mounted on an upper surface of the absorber plate, and first heat exchange conduits extending through the absorber plate;
a hybrid bifacial photovoltaic-thermal (PV-T) panel disposed above the absorber plate, the hybrid bifacial PV-T panel having second heat exchange conduits, wherein the hybrid bifacial photovoltaic-thermal (PV-T) panel consists of a first face of photovoltaic solar cells configured for receiving solar radiation directly from the sun and a second face of photovoltaic solar cells configured for receiving reflected solar radiation from the second reflective surface, the hybrid bifacial photovoltaic-thermal (PV-T) panel extending at an oblique angle above the absorber plate;
a layer of thermal insulation disposed between the absorber plate and the second reflective surface;
a thermal storage reservoir disposed below the RFPC; and
an external heat exchange conduit system including a first portion connecting the first and second heat exchange conduits, the heat exchange conduit system defining a closed fluid circuit for circulation of a heat exchange medium between the thermal storage reservoir, the hybrid bifacial PV-T panel, and the RFPC.

2. The combination photovoltaic and thermal energy system according to claim 1, wherein said thermal storage reservoir is disposed below ground level.

3. The combination photovoltaic and thermal energy system according to claim wherein said thermal storage reservoir is made from concrete.

4. The combination photovoltaic and thermal energy system according to claim 1, wherein said thermal storage reservoir is made from fired bricks.

5. The combination photovoltaic and thermal energy system according to claim 1, wherein said thermal storage reservoir includes a thermal insulation material selected from the group consisting of water, sand, and a phase change material (PCM).

* * * * *